United States Patent
Goyetche

(10) Patent No.: US 6,599,341 B2
(45) Date of Patent: Jul. 29, 2003

(54) EXHAUST FAN FOR REMOVING AIRBORNE MATERIALS

(76) Inventor: Michael E. Goyetche, 23 Valley Rd., Nahant, MA (US) 01908

( * ) Notice: Subject to any disclaimer, the term of this patent is extended or adjusted under 35 U.S.C. 154(b) by 0 days.

(21) Appl. No.: 10/213,676

(22) Filed: Aug. 6, 2002

(65) Prior Publication Data

US 2002/0189215 A1 Dec. 19, 2002

Related U.S. Application Data

(63) Continuation of application No. 09/639,869, filed on Aug. 16, 2000, now Pat. No. 6,440,190.

(51) Int. Cl.$^7$ .............................................. B01D 46/10
(52) U.S. Cl. ........................ 55/473; 55/385.1; 55/385.2; 55/438; 55/439; 55/471; 55/DIG. 46
(58) Field of Search ............................ 55/385.2, 471, 55/473, 438, 439, 495, 385.1, DIG. 46; 454/187

(56) References Cited

U.S. PATENT DOCUMENTS

| | | |
|---|---|---|
| 3,570,386 A | 3/1971 | Baumann et al. |
| 4,013,432 A | 3/1977 | Finger |
| 4,560,395 A | 12/1985 | Davis |
| 4,662,912 A | 5/1987 | Perkins |
| 4,750,673 A | 6/1988 | Brunig |
| 4,750,863 A | 6/1988 | Scoggins |
| 4,781,526 A | 11/1988 | Mead |
| 4,867,764 A | 9/1989 | Diskin et al. |
| 5,038,577 A | 8/1991 | Stanford |
| 5,266,004 A | 11/1993 | Tsumurai et al. |
| 5,334,000 A | 8/1994 | Nordlin |
| 5,341,565 A | 8/1994 | Kuryliw |
| 5,358,443 A | 10/1994 | Mitchell et al. |
| 5,370,576 A | 12/1994 | Krofchalk |
| 5,370,721 A | 12/1994 | Carnahan |
| 5,470,363 A | 11/1995 | Leader et al. |
| 5,489,238 A | 2/1996 | Asselbergs |
| 5,496,389 A | 3/1996 | Wilcox |
| 5,562,412 A | 10/1996 | Antonelli |
| 5,573,383 A | 11/1996 | Uemura et al. |
| 5,658,130 A | 8/1997 | Goldstein et al. |
| 5,658,195 A | 8/1997 | Marvin, Jr. et al. |
| 5,738,167 A | 4/1998 | Asbjornson et al. |
| 5,843,344 A | 12/1998 | Junkel et al. |

OTHER PUBLICATIONS

Advertisement. "Special #2 Power Cat Lightweight Exhaust System."
Advertisement. "Port–A–Vent Exhaust System exclusively by: Munro Bath Systems."
Advertisement. "Equipment Specials: Industrial Fume Exhauster."
"Operating Instructions & Parts Manual" for Dayton Venturi–Mounted Exhaust Fans, pp. 1–7.
Brochure from Americ Corporation advertising different ventilators. 9 pages.

Primary Examiner—David A. Simmons
Assistant Examiner—Minh-Chau T. Pham

(57) ABSTRACT

A portable, light-weight exhaust fan that can be easily and quickly carried to and set up in a localized area to safely, efficiently and substantially remove airborne materials thereby overcoming the above and other drawbacks of conventional exhaust fans. Exhaust fans in accordance with aspects of the present invention may be used to ventilate a localized area such as an enclosed room and may be placed in any aperture such as a window or doorway to remove airborne material from the air passing therethrough, and to exhaust filtered air directly or indirectly to the surrounding environment. The exhaust fan can be constructed such that air traveling along an exhaust path through the fan is prevented from contacting components of the fan that can be damaged by exposure to the airborne materials. This enables the exhaust fan to efficiently remove airborne materials from a localized area while preventing the same materials from adversely affecting the operation of the fan. This has particular utility in application wherein the airborne material such as paint over spray adheres readily to surfaces. By preventing the accumulation of debris on internal fan components, the fan operates with greater efficiency for longer periods of time, does not require the extensive periodic cleaning that conventional exhaust fans mandate, and has a significantly longer operational life. The fan is constructed and arranged to prevent combustible airborne materials from coming into contact with components of the exhaust fan that can serve as incendiary promoters to such combustible airborne materials.

38 Claims, 8 Drawing Sheets

US 6,599,341 B2

EXHAUST FAN FOR REMOVING AIRBORNE MATERIALS

RELATED APPLICATIONS

The present invention is a continuation of U.S. patent application 09/639,869 filed Aug. 16, 2000 now U.S. Pat. No. 6,440,190 entitled PORTABLE EXHAUST FAN FOR REMOVING AIRBORNE HAZARDOUS MATERIALS and naming as inventor Michael E. Goyetche, now pending.

BACKGROUND OF THE INVENTION

Field of the Invention

The present invention relates generally to exhaust fans and, more particularly, to exhaust fans for removing airborne materials.

Related Art

Stationary and portable fans have been known for years and have been used for numerous applications. One use of exhaust fans of particular pertinence to the present invention is the removal of airborne contaminants from a localized area. As used herein, the term airborne material refers to any particles, fumes, dust, chemicals or other materials that are suspended in the air.

There are many drawbacks to traditional exhaust fans used for removing various airborne materials in different applications. In particular, there are significant drawbacks associated with conventional exhaust fans that are used for removing from a localized area overspray from spray painting, airborne dust from surface sanding, airborne chemicals from painting, varnishing, staining and similar activities.

One such drawback is that conventional exhaust fans expose the air traveling through the fan to events that can ignite flammable airborne materials. Thus, conventional exhaust fans are generally inappropriate to be used to remove safely from a localized area air having flammable or combustible airborne materials.

Another drawback is that currently-available exhaust fans do not protect the internal components of the fan from the air passing therethrough, resulting in an accumulation of materials on such internal components. Certain airborne materials such as paint overspray readily accumulate on the internal components of the fan such as the fan blade, blade shaft, grating, electrical components, etc. This requires conventional fans to be periodically disassembled and cleaned. Unfortunately, such conventional fans cannot be disassembled. As result, an exhaust fan used in such applications is often replaced once a significant amount of material accumulates on the fan components and adversely affects the operating performance of the fan.

Another significant drawback to conventional exhaust fans is that they often do not clean the air before releasing it into the surrounding environment. That is, the airborne materials are not removed from the air. As a result, such conventional exhaust fans are unsuitable for use in many communities in which clean air standards have been established.

What is needed, therefore, is an exhaust fan that can safely remove airborne contaminants from a localized area without damaging the exhaust fan itself or releasing the materials into the surrounding environment.

SUMMARY OF THE INVENTION

The present invention is directed to an exhaust fan that can safely, efficiently and substantially remove airborne materials thereby overcoming the above and other drawbacks of conventional exhaust fans. Exhaust fans in accordance with aspects of the present invention may be used to ventilate a localized area such as an enclosed room and may be placed in any aperture such as a window or doorway to remove substantially all airborne material from the air passing therethrough, and to exhaust filtered air directly or indirectly to the surrounding environment. Certain aspects of the present invention are directed generally to an exhaust fan constructed such that airborne material suspended in air traveling along an exhaust path through the fan is prevented from contacting components of the fan that can be damaged by exposure to the airborne materials. This enables the exhaust fan to efficiently remove airborne materials from a localized area while preventing the same materials from adversely affecting the operation of the fan. This has particular utility in application wherein the airborne material such as paint overspray adheres readily to surfaces. By preventing the accumulation of debris on internal fan components, the fan operates with greater efficiency for longer periods of time, does not require the extensive periodic cleaning, and has a significantly longer operational life. The fan components that necessarily come into contact with the air; for example, the interior surface of the exhaust chamber and the vanes of the fan, are preferably accessible and/or removable to facilitate cleaning.

A number of aspects of the invention are summarized below, along with different embodiments that may be implemented for each of the summarized aspects. It should be understood that the summarized embodiments are not necessarily inclusive or exclusive of each other and may be combined in any manner in connection with the same or different aspects that is non-conflicting and otherwise possible. These disclosed aspects of the invention, which are directed primarily to exhaust fans, are exemplary aspects only and are also to be considered non-limiting.

In one aspect of the invention a portable exhaust fan for removing airborne materials from a localized area is disclosed. The fan includes a housing having an inlet opening and a discharge opening and an air passageway between the inlet and discharge opening. A centrifugal blower unit mounted such that at least rotating blades of the blower unit are located within the air passageway to draw air into the inlet opening and to cause the air to travel through the air passageway and exit through the discharge opening. Importantly, substantially all of the airborne material is removed from the air prior to the air traveling through the air passageway. In addition, the air traveling through the air passageway does not contact surfaces or components that are adversely affected by coming into contact with the airborne material.

In one embodiment, the fan components include electrical components. In such an embodiment the exhaust fan further includes an electrical box constructed and arranged to prevent exposure of said electrical components housed therein from airborne materials traveling through the air passageway. For example, in one particular embodiment, the electrical box is secured within the housing and is substantially impenetrable by the air traveling through the air passageway. Alternatively, the electrical box is secured to an exterior surface of the housing. Preferably, the electrical box is an explosion proof electrical box.

In the same or another embodiment of this aspect of the invention, the exhaust fan components further include electrical wiring. In such embodiments, the exhaust fan further includes sealed conduits through which said electrical wiring travels within said housing, wherein said conduits are substantially impermeable to the airborne materials that are being removed from the localized area.

In another aspect of the invention, a portable, light-weight exhaust fan that can be easily and quickly carried to and set up in a localized area to safely, efficiently and substantially remove airborne materials including flammable airborne materials, is disclosed. The exhaust fan is constructed such that air traveling along an exhaust path through the fan is prevented from contacting components of the fan that can be damaged by exposure to the debris and that can ignite flammable debris in the air. This prevents the airborne materials from accumulating appreciably on the exhaust fan components such as the blower fan blade. In one application the airborne materials comprise paint overspray; in others, hazardous airborne materials; in still others, flammable materials.

In specific embodiments, the exhaust fan is constructed and arranged such that the exhaust path prevents air from coming into contact with those fan components that are incendiary promoters. This includes, for example, high temperature surfaces, electrical components, etc. Such electrical components may further prevented from exposure to the localized environment to further insure they do not ignite the flammable airborne materials before passing through the exhaust fan.

In one embodiment of this aspect of the invention, the internal components of the exhaust fan that are exposed to the air passing therethrough are accessible and removable. In another embodiment, the fun also includes an inlet filter located adjacent to an inlet opening of the in the exhaust path. The filter is constructed and arranged to remove at least those airborne materials that can accumulate on or otherwise damage the internal fan components. Preferably, the fan also includes an exhaust filter located adjacent to a discharge opening of the in the exhaust path. Such an exhaust filter can be constructed and arranged to remove the airborne materials that may damage the environment.

The exhaust fan also may include a flexible exhaust tube having a proximate end configured to be coupled to the inlet opening of the exhaust fan and a distal end for placement in a localized area for receiving air to be filtered exhausted. In such embodiments, the exhaust fan can be placed in a window or other aperture opening to the surrounding environment while the distal end of the tube can be place in the localized environment for receiving the air to be exhausted. This enables the exhaust fan to be used to remove airborne debris of form a localized environment that does not have a window or other aperture to the surrounding environment.

In a still further aspect of the invention, an exhaust fan for removing airborne materials from a localized environment is disclosed. The fan includes a housing having an inlet opening and a discharge opening and an air passageway between said inlet and discharge openings. A centrifugal blower unit including an enclosed motor and a fan blade removably mounted on a shaft extending therefrom is also included. The, blower unit is mounted within the air passageway to draw air into the inlet opening and to cause the drawn air to travel through the air passageway and to exit through the discharge opening. Also included is an electrical box mounted on an exterior surface of the housing. The electrical box is substantially impenetrable by air, fluids and gases. Two filters are also included in the exhaust fan. An inlet filter located adjacent to an inlet opening of the in the exhaust path is constructed and arranged to remove from the air passing therethrough at least those materials that can accumulate on or otherwise damage the internal fan components. An exhaust filter located adjacent to a discharge opening of the in the exhaust path, constructed and arranged to remove from the air passing therethrough any airborne materials that may damage the environment.

Various embodiments of the present invention provide certain advantages and overcome certain drawbacks of the conventional self-test techniques. Not all embodiments of the invention share the same advantages and those that do may not share them under all circumstances. This being said, the present invention provides numerous advantages including the noted advantage of providing safe and efficient removal of airborne materials including hazardous materials from the localized air. These and other features and advantages of the present invention as well as the structure and operation of various embodiments of the present invention are described in detail below with reference to the accompanying drawings.

BRIEF DESCRIPTION OF THE DRAWINGS

The above and further advantages of the invention will be more clearly appreciated from the following detailed description when taken in conjunction with the accompanying drawings, in which like reference numerals indicate like structures or method steps, in which the left-most one or two numerals of a reference numeral indicate the number of the figure in which the referenced element first appears, and in which.

DETAILED DESCRIPTION

1. Introduction

Figure 1A:
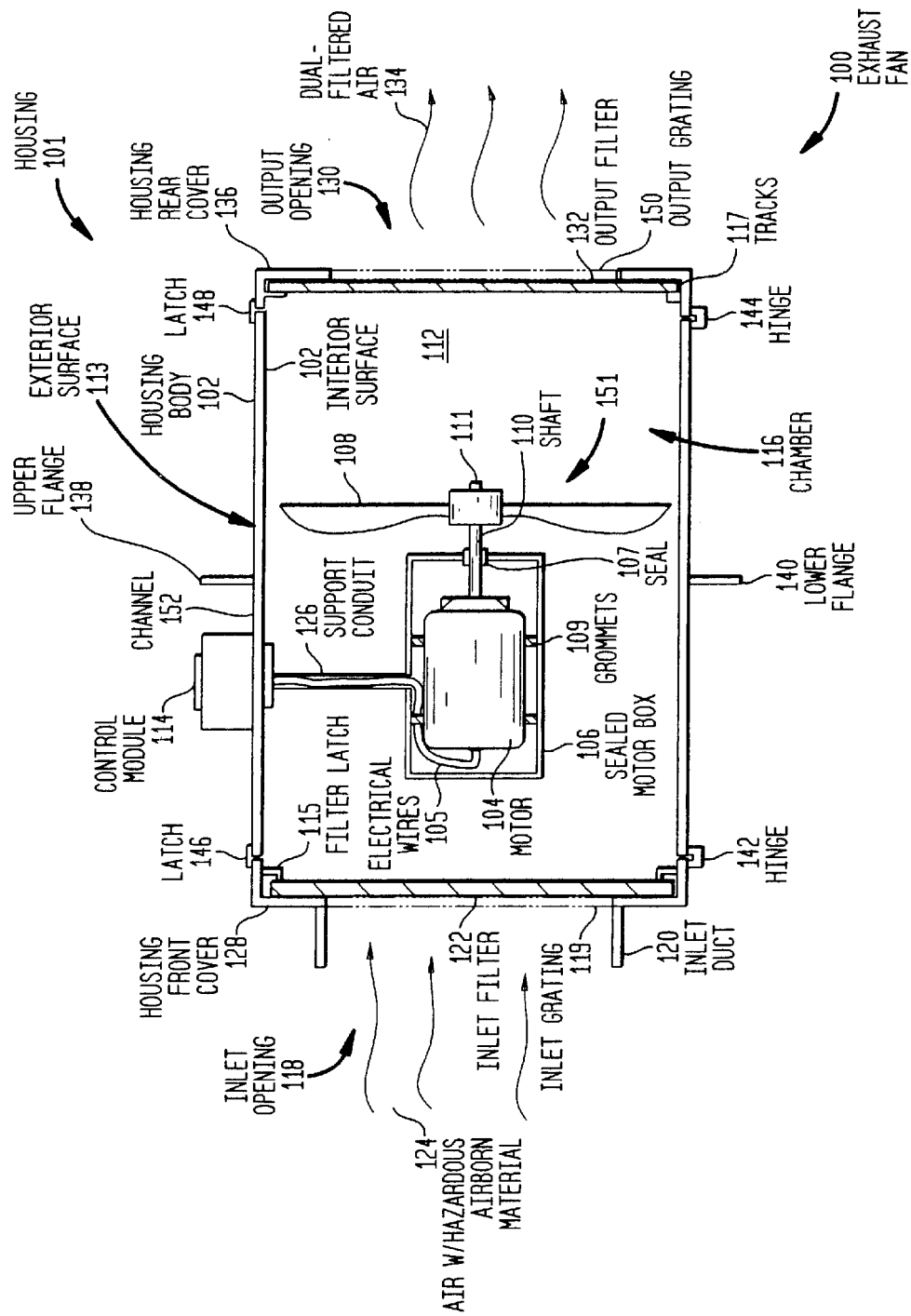
FIG. 1A is a side view of an exhaust fan in accordance with one embodiment of the present invention.

The present invention is directed to an exhaust fan that can easily and quickly be carried to and set up in a localized area to safely, efficiently and substantially remove airborne materials. Exhaust fans in accordance with aspects of the present invention may be used to ventilate a localized area such as an enclosed room and may be placed in any aperture such as a window or doorway to remove substantially all airborne debris and to exhaust filtered air directly or indirectly to the environment. One disclosed aspect of the present invention is directed generally to an exhaust fan constructed such that airborne materials contained in air traveling along an exhaust path through the fan are prevented from contacting components of the fan that can be damaged by exposure to such materials. This enables the fan to efficiently remove airborne materials from a localized area while preventing the material from accumulating appreciably on exhaust fan components. This has particular utility in applications wherein the airborne debris such as paint overspray adheres readily to surfaces. By preventing the accumulation of debris on internal fan components, the fan operates with greater efficiency for longer periods of time, does not require the extensive periodic cleaning that conventional exhaust fans mandate, and has a significantly longer operational life. The fan components that necessarily come into contact with the air; for example, the interior surface of the exhaust chamber and the vanes of the fan blade, are preferably accessible and/or removable to facilitate cleaning.

The above and other features of the present invention prevent airborne materials from accumulating on the fan components such as the motor, motor shaft, bearings, fan blade and the like. Depending on the airborne debris, this may cause damage ranging from corrosion of internal surfaces, interference with blade rotation, physically impeding device operation, shorting or otherwise interfering with electrical components, etc. For example, accumulation of paint overspray can occur quickly and may severely hamper the operation of the fan. Over what may be a very short period of time such accumulation can reduce the efficiency of the exhaust fan (that is, continually reducing the CFMs), rendering the exhaust fan inefficient or ineffective. This can continue until the motor seizes, rendering the fan inoperable. It is not uncommon for example, for painters to dispose of conventional commercial exhaust fans after a few weeks of continual use due to the accumulation of overspray on the motor, blades, blade shaft and other components.

Preferably, the exhaust fan is constructed and arranged such that the air does not come into contact with incendiary promoters such as high temperature surfaces, components that transport or are powered by electrical current, and the like. This enables the fan to remove safely air that includes airborne materials that are flammable or combustible. In addition, such incendiary promoters are also shielded from the localized environment to prevent ignition of localized air that has not yet been drawn through the exhaust fan. For example, the electrical components are preferably located in a sealed, air-impermeable or explosion-proof boxes and conduits mounted to the exterior of the exhaust fan.

Embodiments of the fan also include disposable inlet and exhaust filters located in the exhaust path on opposing sides of the fan blades. The inlet filter is constructed to remove at least those hazardous materials that can accumulate on or otherwise damage the internal fan components. The exhaust filter is constructed to remove the same or additional airborne hazardous materials that may damage the environment. Advantageously, only the disposable filters need be changed to maintain the fan in operable condition, eliminating the need for costly and time consuming cleaning processes or the disposal of the fan due to a reduction in operating effectiveness.

For those localized areas that are enclosed and which lack a window or other aperture connecting directly the localized area with the outside environment, aspects of the invention include a flexible exhaust tube that extends from the localized area to the exhaust fan located in a aperture. The conduit may be a flexible, extendable pipe having a proximate end for attaching to the fan inlet and a distal end for being located in the localized area. In certain embodiments, the distal end of the conduit may also include a filter to prevent accumulation of debris on the internal surface of the conduit.

Thus, as will be described in detail below, in one embodiment, the exhaust fan of the present invention is a long lasting, portable exhaust fan that can remove airborne materials such as overspray, fumes and dust particle from painted or sanded surfaces, flammable and combustible materials, etc., without damaging or reducing the operating life of the fan itself and while preventing the exhaust fumes from harming the environment.

2. Exemplary Exhaust Fan

Figure 1B:
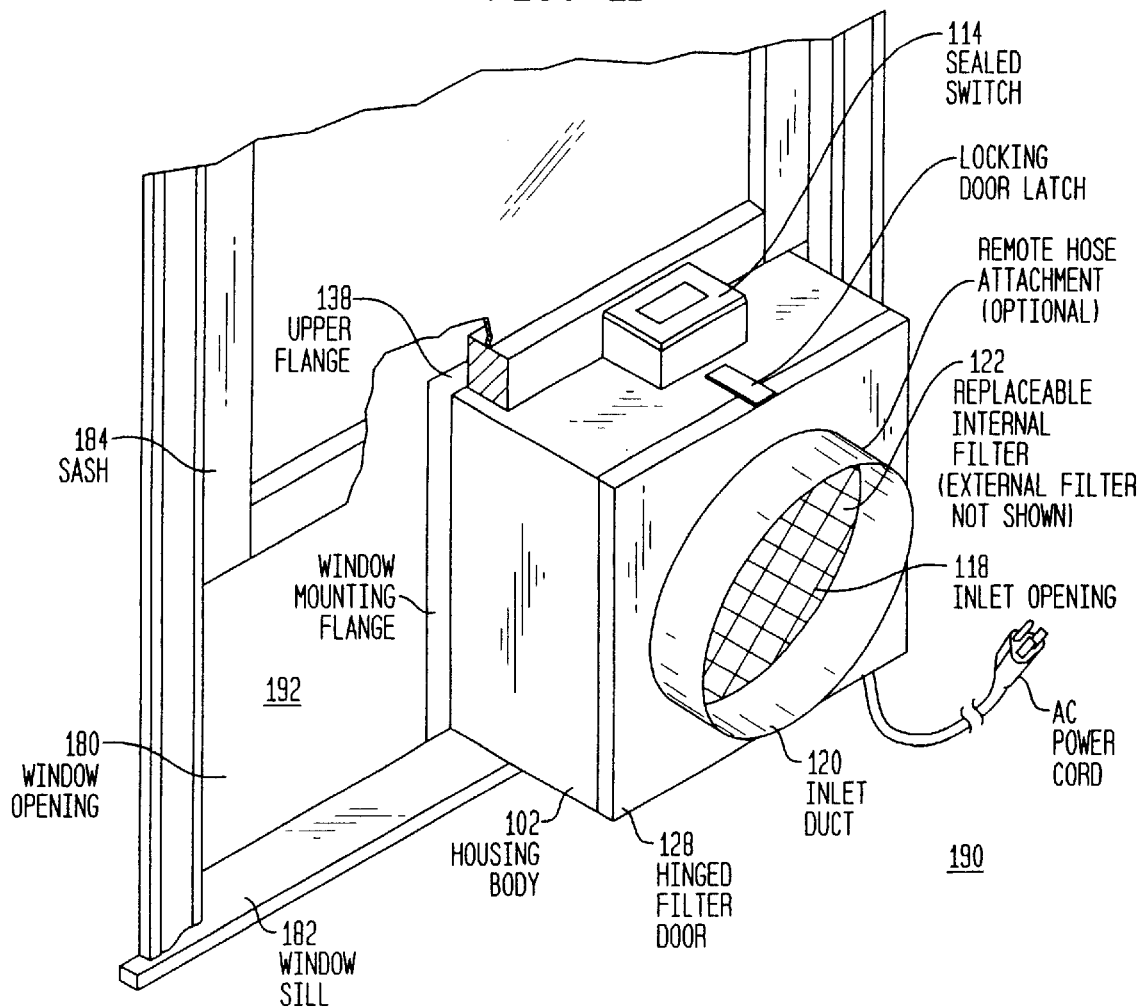
FIG. 1B is a perspective view of the fan illustrated in FIG. 1 installed in a window having vertical adjusting sashes.
Figure 2:
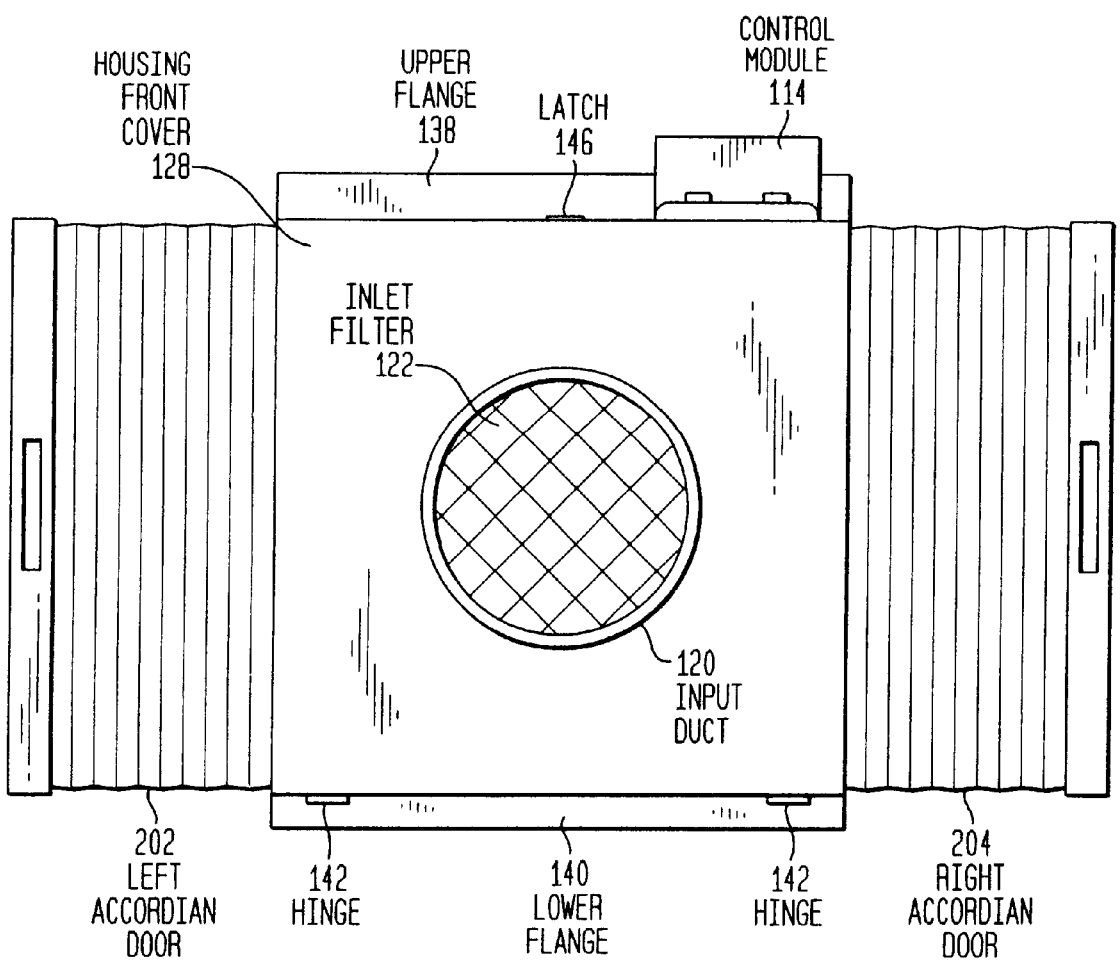
FIG. 2 is a front view of the exhaust fan illustrated in FIGS. 1A and 1B.

FIG. 1A is a side view of an exhaust fan in accordance with one embodiment of the present invention. FIG. 1B is a perspective view of the fan illustrated in FIG. 1A installed in a window with vertically adjustable sashes. FIG. 2 is a front view of the exhaust fan as it would be deployed in an aperture in accordance with one embodiment of the invention. Exhaust fan 100 includes generally a housing body 102 in which a motor 104 and fan blade assembly 108 are housed. Together, motor 104 and fan blade unit 108 comprise fan assembly 151.

In this illustrative embodiment, exhaust fan 100 includes a hinged housing front cover 128 and a hinged housing rear cover 136 attached to housing body 102. In accordance with one embodiment of the invention, replaceable filters are implemented to capture airborne debris before entering exhaust path 112 as well as before the air exits output opening 130. In the illustrative embodiment, each housing cover 128, 136 includes a filter configured to remove airborne materials. Specifically, an inlet filter 122 is removably secured within housing cover 128 and an outlet filter 132 is removably secured within rear housing cover 136. As fan assembly 108 rotates, contaminated air 124 is drawn through inlet opening 118, inlet filter 122 to enter an exhaust path 112 defined by chamber 116. The filtered air then travels through output filter 132, resulting in the release of dual-filtered air 134 to the environment. In this illustrative embodiment, exhaust fan 100 is configured to be operationally positioned within a window and is controlled through a control module 114. Each of the components is described in detail below.

Housing 101 includes housing body 102 and, in this embodiment, front and rear doors or covers 128, 136. Housing 101 has a substantially rectangular configuration in the illustrative embodiment for placement in a window or other aperture. However, it should be understood that housing 101 may vary widely in form and shape depending on the anticipated operational location of exhaust fan 100. Housing 101 may be a fabricated metal, molded plastic construction, synthetic resins, etc.

Preferably, interior surface 103 of housing body 102 is substantially smooth to prevent interference with the flow of air through exhaust passageway 112, and to avoid providing surfaces to which airborne contaminants can adhere. It is also preferable that housing body 102 be a unitary member or includes appropriate seals at any joints to provide a sealed exhaust path 112 that prevents contaminated air 124 from escaping from chamber 116 to the environment before passing through outlet filter 132.

As noted, the configuration of exhaust fan 100 is one such that the fan can be secured within a window having upper and lower sashes. Secured to or formed with housing body 102 of such an embodiment is an upper flange 138 extending from the top wall of housing body 102 and a lower flange 140 extending from a bottom wall of housing body 102. Lower flange 140 is configured to fit behind a window sill while upper flange 138 is configured to fit behind a lower window sash opened to received exhaust fan 100. To prevent exhaust fan 100 from falling out of the window, a channel 152 is provided to receive the window sash. The window sash fits in channel 152 formed, in this embodiment, by control module 114 and upper flange 130. As such the window closes over fan 100 pinning it in place by entrapping the housing against the window sill. It should be understood that alternative approaches may be used to secure exhaust fan 100 in a window aperture, depending upon the configuration of the window. In the illustrative embodiment, upper flange 138 and control box 114 are spaced to receive sash 184. When sash 184 is positioned between control box 114 and sash 184, with exhaust fan 100 resting on window sill 182, fan 100 will remove airborne debris from localized area 190 to surrounding environment 192.

Referring to FIG. 2, on at least one side, and preferably both sides of exhaust fan housing body 102, is an accordion door. In the illustrative example, a left accordion door 202 is secured to the left side of housing body 102 while a right accordion door 204 is secured to a right side of housing body 102. The accordion doors 202, 204 may be used to close off any portion of the aperture that is not consumed by exhaust fan 100. This insures that contaminated air does not escape the localized area with being filtered by the dual filters of exhaust fan 100. Preferably, accordion doors 202, 204 have conforming seals along their edges to further minimize or prevent contaminated air from escaping the localized area.

As noted, fan assembly 151 includes a motor 104 and fan blade unit 108 attached to and controlled by motor 104. Electric motor 104 is disposed within a sealed motor box 106 that is suspended from and supported by a support conduit 126 secured to one or more sidewalls of housing body 102. As shown in FIG. 1A, support conduit 126 not only provides structural support to motor 104, but also provides an enclosed path through which electrical wires and ventilating air can travel. This prevents airborne contaminants from coming into contact with electrical wires 105 and from escaping exhaust fan 100 through component ventilation paths.

As noted, motor 104 is housed within sealed motor box 106 in this illustrative embodiment. Such a box 106 prevents the accumulation of contaminants on motor 104, preventing interference with the electrical connection with wires 105, rotation of shaft 115, etc. In alternative embodiments, motor manufacturers may provide a fully self-contained motor that can withstand such exposure, thereby negating the need for such a sealed box 106.

Motor 104 is secured within sealed box 106 through upper and lower grommets 109 to avoid damage due to shock and to dampen vibration from blade rotation. Shaft 110 exits sealed motor box 106 through an aperture on a downstream side of motor box 106. This limits the exposure of shaft 110 to airborne contaminants due to the airflow patterns around sealed motor box 106. A bearing seal 107 is provided at the aperture to rotationally support shaft 110 while maintaining the integrity of sealed motor box 106.

Removably attached to shaft 110 is fan blade assembly 108. Fan blade assembly 108 includes any number of blades to provide the desired air flow. A bolt 111 secures blade assembly 108 to shaft 118. Bolt 111 is also positioned at a location and orientation that limits its exposure to the flow of air through chamber 116 to avoid accumulation of airborne materials that ultimately interferes with or prevents to removal of fan blade assembly 108. Despite the superb filtering of airborne contaminants by inlet filter 122, it may be desirable to clean periodically fan blade assembly 108. This may be accomplished by opening rear cover 136 and removing bolt 111. To prevent combustion of air 124, fan blade unit is manufactured from a non-sparking material such as aluminum. It is preferred that such a material also be capable of withstanding chemical cleaning.

As one of ordinary skill in the relevant art would find apparent, motor 104 may be any motor suitable for the overall size of exhaust fan 100 and the requisite CFMs. For example, to delivery 500 CFMs or more, a fan having a blade diameter of at least 10 inches would be likely used in one embodiment. On the other hand, if space was at a premium and significant CFMs are required, then motor 104 should be capable of operating a sufficient RPM to deliver the requisite CFMs. In one particular embodiment, fan assembly 151 is a Dayton 4C650 fan with a 10 inch diameter fan blade and a motor 104 that can operate at 1550 RPM to deliver 520 CFMs. In an alternative embodiment, fan assembly 151 is a Dayton 4C650 fan wwith a 12 inch diameter fan blade and a motor 104 that can operate at 1550 RPM to deliver 700 CFMs. In an alternative embodiment, fan assembly 151 is a Dayton 4C658A fan with a 10 inch diameter fan blade and a motor 104 that can operate at 1550 RPM to deliver 595 CFMs. Preferably, such fan embodiments are sealed in motor box 106 as described above to provide an exhaust fan 100 that can be used to remove flammable airborne materials.

Exhaust fan 100 includes a dual filter system including an inlet filter 122 and an outlet filter 132 located on opposing sides of fan blade assembly 108 in exhaust path 112. Inlet filter 122 filters the air 124 to remove fan-adverse contaminants from the air before the air impinges upon the fan blade 108 and other internal components. Outlet filter 132 filters the filtered air to remove contaminants that are damaging to the environment. Thus, contaminated air 124 enters inlet duct 120 and passes through inlet opening 118 to be filtered through inlet filter 122 before entering chamber 116.

Inlet filter 122 and outlet filter 132 may be any type of filter now or later developed that removed the particular airborne contaminants that, in the case of inlet filter 122 may adhere to, accumulate on or otherwise damage internal components of exhaust fan 100, and in the case of outlet filter 132 may be damaging to the environment. In one embodiment, inlet and output filters 122,132 are manufactured from a filter material of sufficient porosity to permit a desired volume of air to pass therethrough while retaining the desired contaminants which may be suspended in the mass of moving air. For example, the filter material used in filters 122, 132 may comprise a particulate filter made of fiberglass, etc., a sorbent filter made of carbon, zeolite, etc, for absorption of gases and odors. In one embodiment, the particulate filter may be electrically charged; that is, an electret. In yet another embodiment, an ion emitter is also utilized. The electret filter material in combination with the ion emitter will enhance the capturing of airborne particles which become charged when the enter the electric field surrounding the fan. Any suitable porosity and material for removing the particular airborne particles may be used.

Filters 122, 132 may take different forms. In the illustrative embodiment, filters 122, 132 include filter material in a cardboard or disposable plastic container. Preferably the filter container is self-supporting. In the illustrative embodiment, filters 122, 132 are secured within corresponding covers or doors 128 and 136, respectively. Filters 122, 132 may be secured within the covers using any well-known technique. In the example illustrated in FIGS. 1A–1B, adjustable latches 115 are utilized to secure inlet filter 122 to front cover 128. As another example, tracks 117 are formed in rear cover 136 to receive a replaceable outlet filter 132. In one embodiment, filters 122, 132 are Binks Sames carton paint pocket filters, number 29-2372, available from Binks Sames, Franklin Park, Ill. In another embodiment, filters 122, 132 are Binks Sames single piece blanket paint pocket filters, number 29-2359, available from Binks Sames, Franklin Park, Ill. It should be understood, however, that filters 122, 132 can be any filter appropriate for capturing the intended airborne materials.

To provide access to filters 122, 132 for cleaning and replacement, housing front cover 128 and rear cover 136 are hinged to housing body 102. Hinges 142 and 144 are provided for such purposes, and the doors are latched to housing body 102 via latches 146, 148, respectively. As one of ordinary skill in the art would appreciate, any well-known mechanism now or later developed may be used to provide access to filters 122, 132 and to releasably secure front and rear covers 128, 136 to housing body 102. For example, latches 146, 148 may be magnetic latches, among others.

Figure 3:
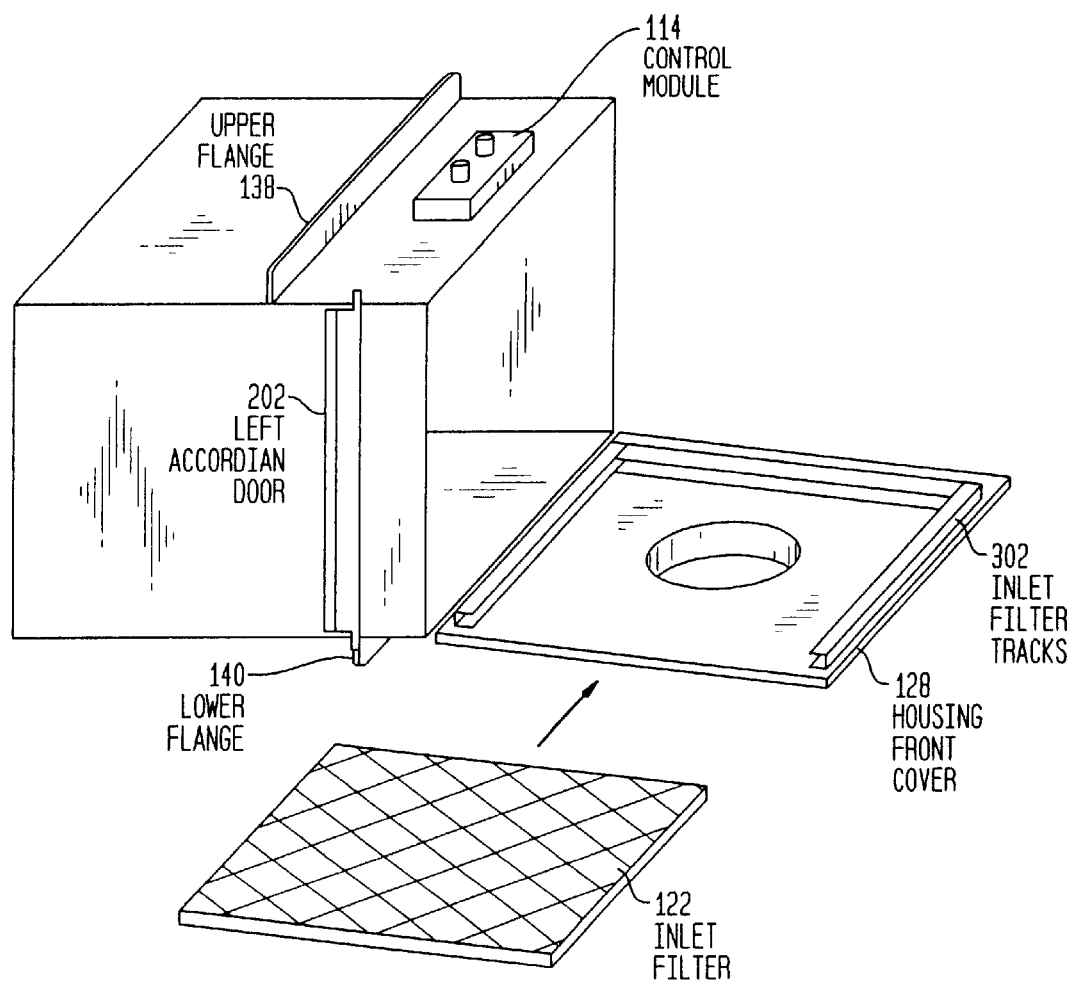
FIG. 3 is a perspective view of one embodiment of the invention in which input filter is secured within tracks in the exhaust fan housing.

FIG. 3 is a perspective view of one embodiment of the invention in which input filter 122 is secured within tracks in housing front cover 128. Inlet filter tracks 302 run substantially along the length of each of three sides of housing cover 128, with the fourth side open to facilitate installation and removal of filter 122. As shown in FIG. 3, this embodiment of filter 122 is self-contained in a substantially rigid porous cardboard exterior surface. In the embodiment illustrated in FIG. 1, a filter retaining member in the form of a grating is illustrated on the exterior sides of inlet and outlet filters 122, 132. Specifically, inlet grating 119 is secured in inlet opening 118 and outlet grating 150 is secured within housing rear cover 136. This provides increased safety while not interfering with the flow of air through chamber 116.

Figure 4:
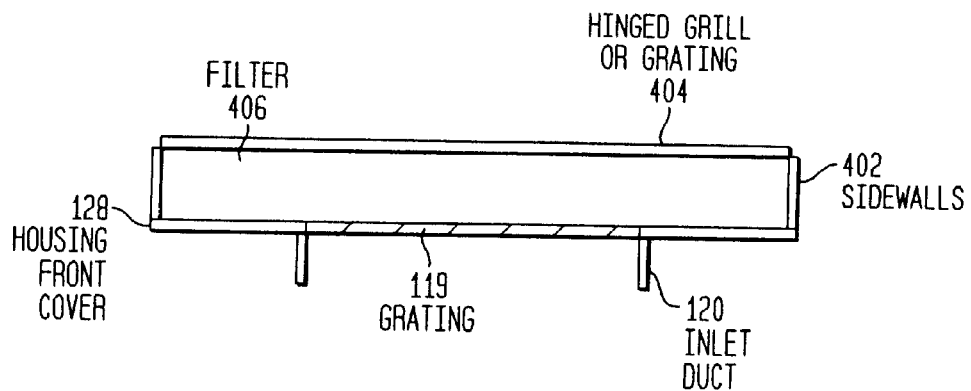
FIG. 4 is a side view of another embodiment of the present invention in which filters that are not standardized, self-contained filters can be utilized.

FIG. 4 is a side view of another embodiment of the present invention in which standardized, self-contained filters 122, 132 are not available. Here, a filter bay 406 is formed on the interior side of housing front cover 128. Filter bay 406 is defined by side walls 402 mounted on interior surface of cover 128. A hinged grill, grating or other filter retaining member is hingedly secured to housing front cover 128. As such, any filter material may be placed in filter bay 406 and held in place with grating 404. This embodiment is particularly useful when either filter 122 or 132 are in the form of a flexible package or several packages containing the particulate filter material. To facilitate the use of such filters, the embodiment illustrated in FIG. 4 provides filter bay or enclosure 406 that retains such a filter in a flat operational configuration regardless of the orientation of exhaust fan 100.

It should be understood that any filter retaining member can be used to be attached to both sides of housing covers 128, 136 to hold corresponding filter 122, 132. Such filter retaining members are porous to enable air to pass therethrough. For example, the filter retaining members may be gratings as illustrated in FIGS. 1A and 1B. On the interior sides of the housing covers, the filter retaining members includes fasteners, latches, adhesives, screws, bolts and levers, magnetic catches and the like. Gratings may also be used. Preferably, the filter retaining member that serves as inlet grating 119 is of a construction and material that is easily to clean since it has the greatest exposure to airborne materials. As one skilled in the art would appreciate, other porous support structures such as a screen mounted to the frame may be used.

Figure 5:
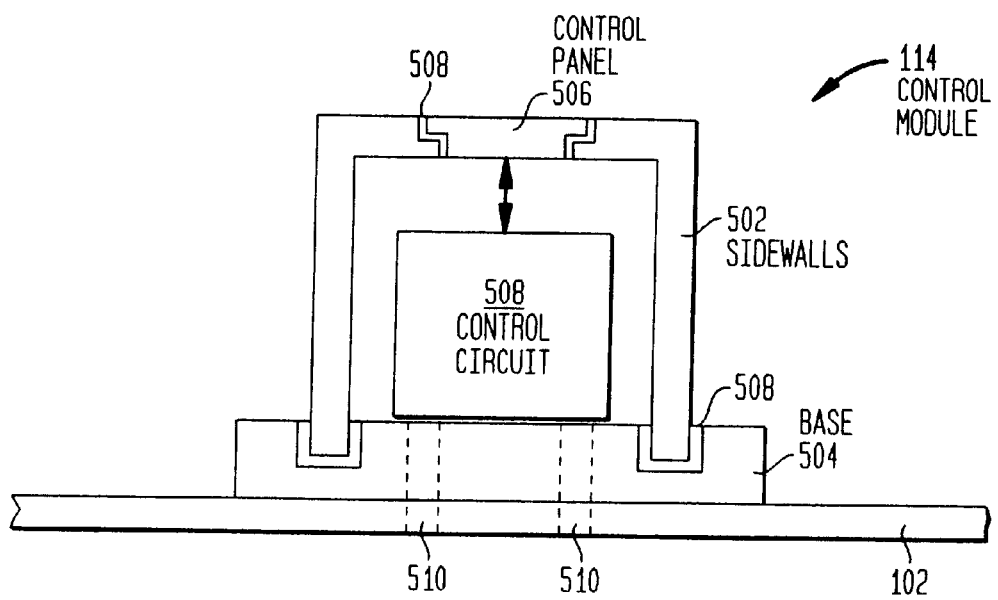
FIG. 5 is a side view of one embodiment of the control module illustrated in FIG. 1A.

Exhaust fan 100 is controlled by an operator through the manipulation of power controls located on a control module 114. In the illustrative embodiment, control module 114 is secured to an exterior surface 113 of housing body 102. FIG. 5 is a side view of one embodiment of control module 114. Control module 114 has a front panel 506 through which the operator controls exhaust fan 100. Control module 114 receives external AC power and applies the power to motor 104 in accordance with operator control inputs. Control module 114 is preferably an air-tight container that is substantially impervious to the surrounding air. Thus, all electrical components and cables are enclosed in an air-impermeable closed system. This enables exhaust fan 100 to be used to remove air 124 having flammable or combustible airborne contaminants. Referring to the illustrative embodiment shown in FIG. 5, for example, control module 114 includes unitary sidewalls 502 secured to a base 504. Control panel 506 is secured to sidewalls 502 such that the top surface of control panel 506 is substantially flush with the top surface of control module 114. Sealant material 508 is used to fill any gaps between neighboring components. Control module 114 includes control circuitry 508 that is electrically connected to motor 104 through passageways 510 in base 504 and housing body 102.

It should be understood that sealed electrical box 114 may be secured directly or indirectly to the interior 103 or exterior 113 surface of fan housing body 102. In addition, and as will be described below, all electrical contacts, switches and the like are implemented with electrical components that minimize arcing and other events that can cause combustion.

Figure 6A:
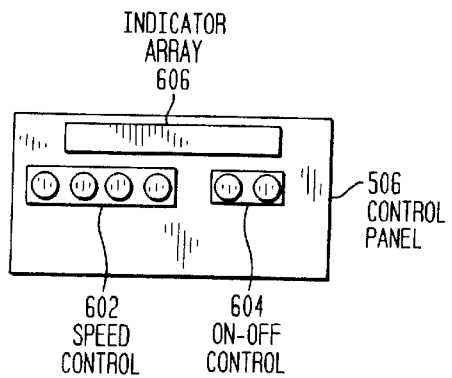
FIG. 6A is a front view of an exemplary control panel that can be implemented in the exhaust fan illustrated in FIG. 1A in accordance with one embodiment of the invention.
Figure 6B:
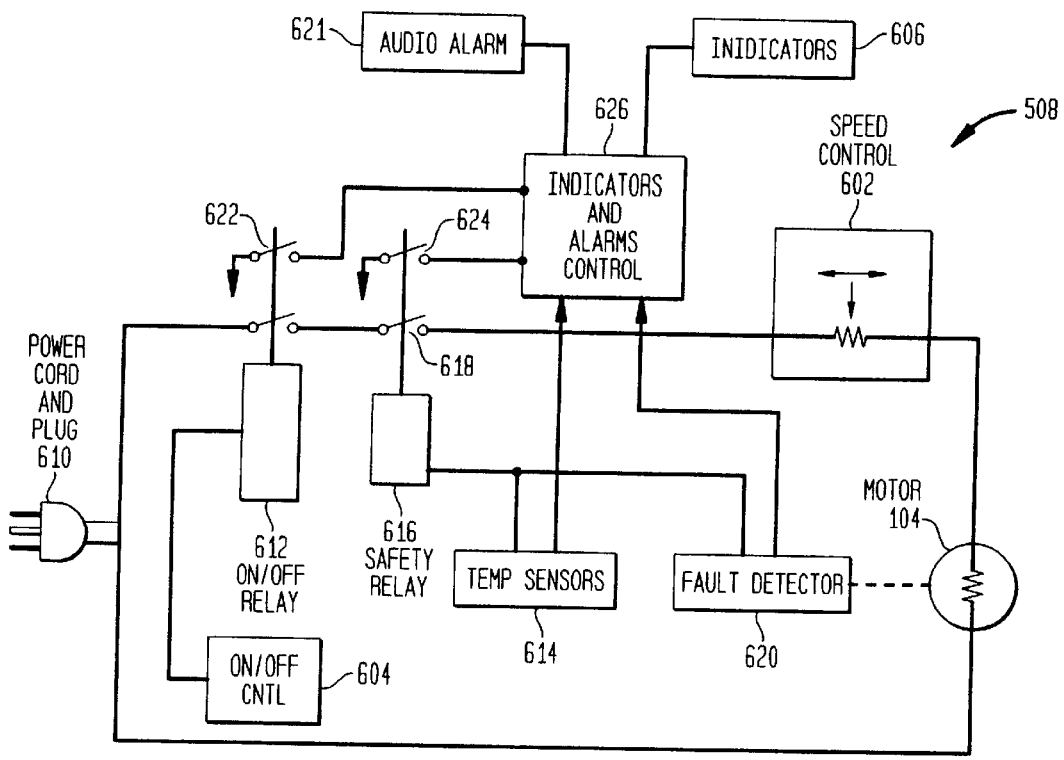
FIG. 6B is a high level schematic diagram of an exemplary embodiment of a control circuit and control panel for use in the exhaust fan of FIG. 1A in accordance with one embodiment of the present invention.

FIGS. 6A and 6B is a high level schematic diagrams of an exemplary embodiment of control circuit 508 and control panel 506, with related sensors. In the illustrative embodiment, control panel 506 includes a speed control 602 and an on-off control 604. The type of manual control inputs implemented in control panel 506 should be selected based on the intended operating environment. For example, in the particular embodiment described herein, exhaust fan 100 is to be used to remove overspray, dust created from sanding painted surfaces and the like. Such airborne debris would accumulate on the typical knobs and buttons used on conventional exhaust fans, eventually impairing the operation of such knobs and buttons.

To prevent such damage from occurring, contact or touch responsive switches operating by capacitance are preferably provided. Such touch responsive switches are well known in the art, and will therefore not be described in greater detail herein. In the illustrative example, speed control selector 602 includes four touch-responsive switches to enable the operator to select direction of rotation and one of three speeds of rotation in the selected direction. On-off control selector 604 includes 2 touch sensitive switches to turn the fan on and off, respectively. It should be appreciated that other techniques for providing control inputs may also be provided, For example, wire or wireless remote control, voice control, and other control approaches may be implemented.

To insure the operator is aware of the operation of exhaust fan 100 at any given time in the potentially noisy environment in which fan 100 will be used, an array 606 of indicators is also provided on control panel 506. The indicators may provide a visual indication of, for example, the on/off status of exhaust fan 100, the speed of rotation and alarm conditions described below.

Referring now to FIG. 6B, power is conducted to fan 100 from a conventional power cord and electrical plug 610. An on/off relay 612 controlled by on-off control selector 604 includes one pole controlling a switch in series with power plug 610 and motor 104. Speed control selector 602 is also connected in series with plug 610 and motor 104 as shown in FIG. 6B.

As noted, exhaust fan 100 may be utilized in environments having hazardous airborne debris. In particular, flammable airborne debris may be removed from a localized area by exhaust fan 100. To insure safety, the temperature and integrity of the electrical system are monitored.

One or more temperature sensors 614 may be implemented in exhaust fan 100 to sense the temperature of any component that may come into contact with the air passing through the exhaust fan 100. For example, temperature sensor(s) may be placed on chamber 116. Additional sensors, for example, may be placed in control module 114 to monitor the temperature of the electrical components contained therein.

The temperature sensor(s) control a safety relay 616 that controls a switch 618 interposed between and in series with motor 104 and power 610. If a temperature greater than some predetermined threshold value is sensed, temperature sensor 614 activates safety relay 616 to open switch 618. Similarly, a fault detection sensor 620 may be included in control module 114. Fault detection 620 monitors the electrical integrity of control module 114, activating safety relay 616 when an electrical fault is detected. As shown in FIG. 6B, on-off relay 612 and safety relay 616 have a second pole 622, 624 that provides grounded inputs to indicators and alarms control module 626. In addition, indicators and alarms control module 626 also receives inputs from temperature sensor(s) 614 and fault detection sensor(s) 620. Based on these inputs, indicator and control module 626 controls an audio alarm 628 and indicator array 606 to provide continual visual and audible operator feedback.

Figure 7:
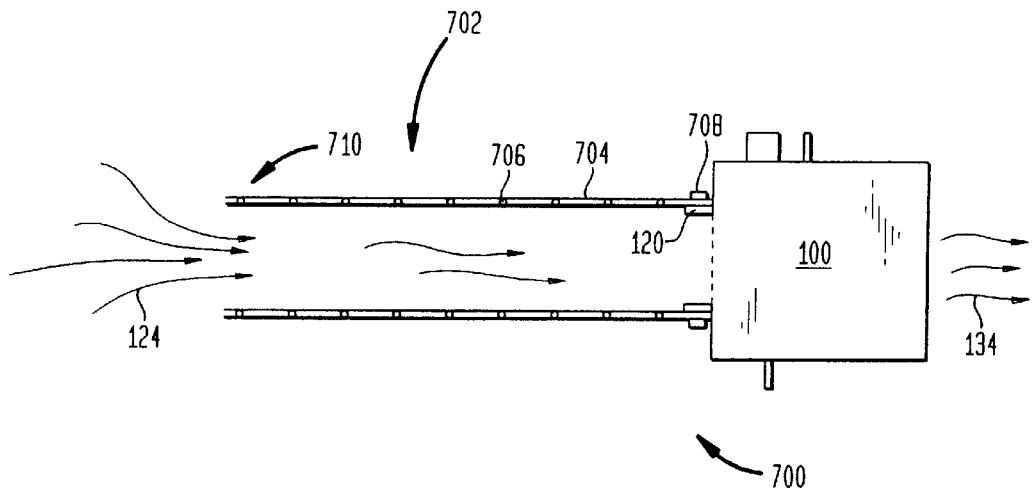
FIG. 7 is a cross-sectional view of one embodiment of the exhaust fan of the present invention including an exhaust tube attached thereto to remove airborne materials from a localized area without having to locate the exhaust fan in that localized area.

FIG. 7 is a side view of an alternative embodiment of the present invention. An exhaust fan assembly 700 includes exhaust fan 100 and a flexible conduit or tube 702. Assembly 700 enables exhaust fan 100 to remove airborne debris from a remote localized area. Exhaust fan 100 is located in an aperture to exhaust filtered air to the environment, as described elsewhere herein. Flexible conduit 702 is secured to inlet duct 120 and extended to the localized area in which the airborne materials are being generated. Such an arrangement is necessary in those localized environments that are lacking apertures to the outside environment.

Flexible conduit 702 includes a lining 704 reinforced with, for example, helical wire to maintain its diameter. Conduit 702 is secured to inlet duct 120 through the use of an adjustable metal strap, although any approach may be used to secure conduit 702 to fan 100. In an alternative embodiment, distal end 710 of conduit 702 includes an inlet filter secured therethrough. The construction and operation of such an inlet filter can be similar to that described above.

Figure 8:
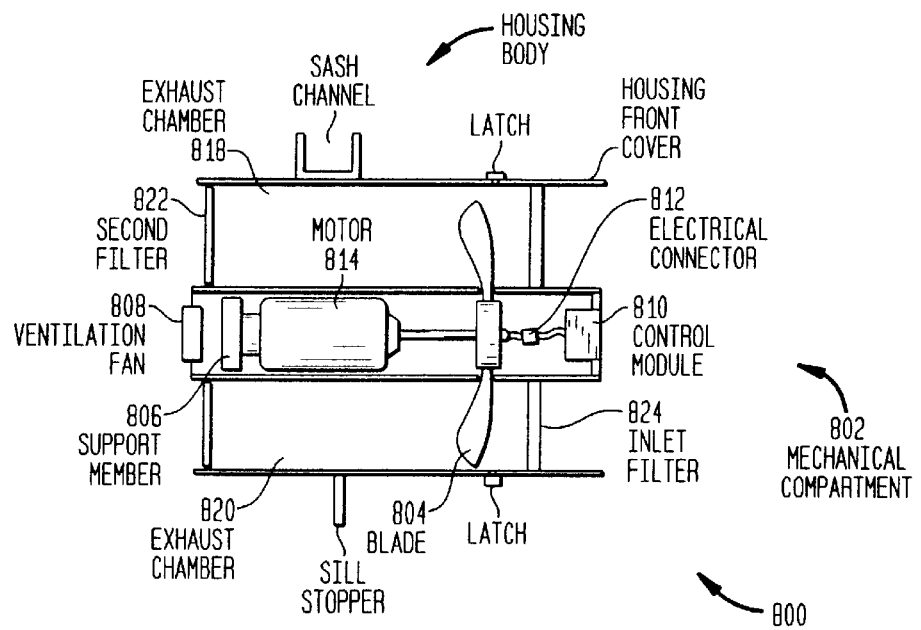
FIG. 8 is a side view of an alternative embodiment of the exhaust fan of the present invention.
Figure 9:
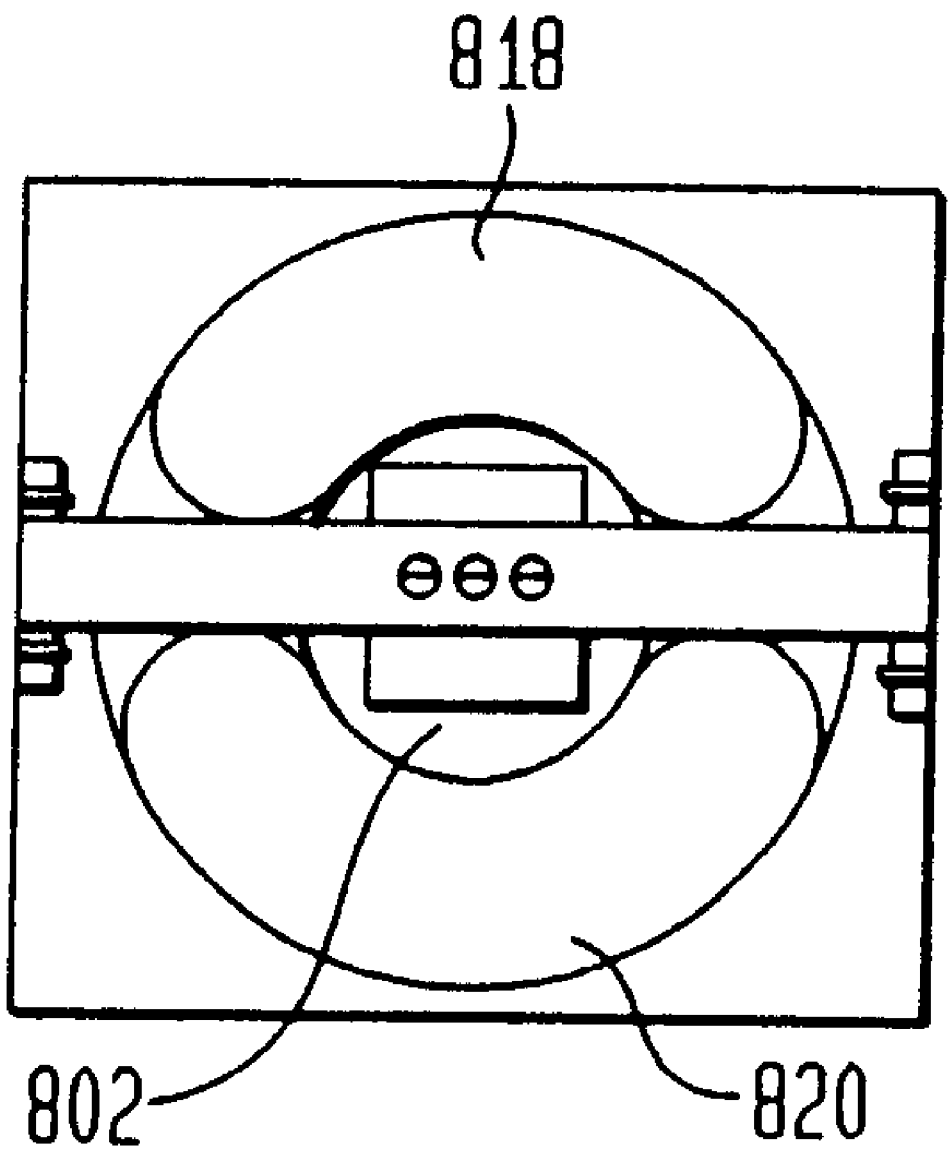
FIG. 9 is a rear view of the exhaust fan illustrated in FIG. 8.

FIG. 8 is a side view and FIG. 9 is a rear view of an alternative embodiment of the present invention. In this alternative embodiment, an exhaust fan 800 provides a sealed exhaust path by segregating two exhaust chambers 818, 820 and a mechanical compartment 802 having located therein substantially all mechanical components of fan 800. In this particular embodiment, exhaust chambers 818 and 820 are on different sides of mechanical components 802 so that a fan blade 804 can extend into each such chamber from mechanical compartment 802.

Mechanical compartment 802 has located therein a motor 814 secured to compartment 802 through one or more support members 806. A ventilation fan 808 is optionally provided at the rear of fan 800 since mechanical compartment is essentially sealed. Fan blade assembly is controlled by motor 814 in response to control inputs provided by an operator through control module 810. Control module 810 includes a user interface that is located at the face of exhaust fan 800 to provide the operator with direct and easy access to a user interface provided by control module 810, as well as to provide an easily visualized array of indicators for operator feedback. Electrical signals from control module 810 are provided to motor 814 through electrical wiring that extends through the shaft of fan blade assembly 804. Preferably, an electrical connector 812 is provided to facilitate removal of control module 810 when necessary.

Individual blades of fan blade 804 extend through an opening between mechanical compartment 802 and exhaust chambers 818, 820. Such an opening preferably includes a seal that substantially reduces the amount of air that it can prevent entering mechanical chamber 802. Surrounding central layer 902 is an exhaust duct 904 that appears on both the top and bottom of mechanical layer 902 due to the cross-sectional nature of the view provided. This duct layer 904 defines a sealed exhaust path through the fan. Finally above and below duct layers 904 are support layers 906 and 908. These functional layers include all mechanical support elements such as window flanges, support legs, etc.

Inlet filters 824 is preferably a single filter that has an aperture in its center. The aperture has a shape and size to receive mechanical compartment 802. Outlet filter 822 has a similar configuration. Alternatively, inlet and outlet filters 824, 822 may each be configured as two filters, one for exhaust chamber 818 and the other for exhaust chamber 820.

While various embodiments of the present invention have been described above, it should be understood that they have been presented by way of example only, and not limitation. Thus, the breadth and scope of the present invention are not limited by any of the above-described exemplary embodiments, but are defined only in accordance with the following claims and their equivalents.

What is claimed is:

1. An exhaust fan for removing airborne materials from a localized area comprising:
   a housing having an inlet opening and a discharge opening and configured so as to define an air passageway between said inlet and discharge openings; and
   a blower unit mounted within said housing and comprising rotatable blades at least partially disposed within said air passageway to draw air into said inlet opening, through said air passageway and exit through said discharge opening;
   wherein said exhaust fan is constructed and arranged to prevent accumulation of airborne materials on components of said blower unit disposed in the air passageway, wherein said airborne materials are materials that ultimately can adversely affect the operational effectiveness of said blower unit.

2. The exhaust fan of claim 1, wherein said exhaust fan further comprises:
   an inlet filter located adjacent to said inlet opening such that substantially all air drawn into said inlet opening travels through said inlet filter, wherein said inlet filter is constructed and arranged to remove at least a portion of said airborne materials.

3. The exhaust fan of claim 1, wherein said exhaust fan is adapted to be installed manually in an aperture.

4. The exhaust fan of claim 3, wherein said aperture is a window.

5. The exhaust fan of claim 1, wherein said exhaust fan further comprises: an enclosure constructed and arranged to house electrical components.

6. The exhaust fan of claim 5, wherein said enclosure is mounted on an interior surface of said housing.

7. The exhaust fan of claim 5, wherein said enclosure is secured to an exterior surface of said housing.

8. The exhaust fan of claim 5, wherein said enclosure is substantially impermeable to the airborne materials.

9. The exhaust fan of claim 5, wherein said enclosure is an explosion proof electrical box.

10. The exhaust fan of claim 1, wherein said rotatable blades are mounted on a rotating shaft of the blower unit, and wherein only said rotatable blades of the blower unit are exposed to said air traveling through said air passageway.

11. The exhaust fan of claim 1, further comprising:
electrical wiring to carry to the blower unit power made available by an external source; and
a sealed conduit through which said electrical wiring travels within said air passageway, wherein said sealed conduit is substantially impermeable to the airborne materials.

12. The exhaust fan of claim 1, wherein said airborne materials comprise paint overspray.

13. The exhaust fan of claim 1, wherein said airborne materials comprise dust and/or fumes.

14. The exhaust fan of claim 1, wherein said exhaust fan is constructed and arranged such that air traveling through said air passageway is prevented from coming into contact with incendiary promoters.

15. The exhaust fan of claim 14, wherein said incendiary promoters comprise one or more of the group consisting of:
high temperature surfaces;
electrical wiring; and
electrical components.

16. The exhaust fan of claim 15, wherein said electrical components are further prevented from exposure to air in the localized environment.

17. The exhaust fan of claim 2, further comprising:
an exhaust filter located adjacent to a discharge opening such that a substantial portion of the air expelled from the exhaust fan travels through the exhaust filter, wherein the exhaust filter is constructed and arranged to remove airborne materials.

18. The exhaust fan of claim 17, wherein the portion of the airborne materials removed from the air by the exhaust filter are materials that may damage the environment.

19. The exhaust fan of claim 1, further comprising:
a flexible exhaust tube having a first end adapted to be operationally coupled to one of either said inlet and send outlet opening of said exhaust fan.

20. The exhaust fan of claim 1, wherein the exhaust fan is portable.

21. An exhaust fan for removing from the localized area air having suspended therein combustible airborne materials, wherein said exhaust fan is constructed and arranged such that air traveling along an exhaust path through the fan is prevented from contacting incendiary promoters in the exhaust fan.

22. The exhaust fan of claim 21, wherein said components of the fan that can cause the combustible airborne materials to combust comprise components that, when operating, can have a surface temperature sufficient to cause said combustible airborne materials to combust.

23. The exhaust fan of claim 21, wherein said components of the fan that can cause the combustible airborne materials to combust comprise electrical components.

24. The exhaust fan of claim 21, wherein said exhaust fan comprises:
a housing having an inlet opening and a discharge opening and configured so as to define an air passageway between said inlet and discharge openings;
a blower unit mounted within said housing and comprising rotatable blades at least partially disposed within said air passageway to draw air into said inlet opening, through said air passageway and exit through said discharge opening;
wherein said exhaust fan is constructed and arranged to prevent accumulation of airborne materials on components of said blower unit disposed in the air passageway, wherein said airborne materials are materials that ultimately can adversely affect the operational effectiveness of said blower unit.

25. The exhaust fan of claim 21, wherein said exhaust fan further comprises:
an inlet filter located adjacent to said inlet opening such that substantially all air drawn into said inlet opening travels through said inlet filter, wherein said inlet filter is constructed and arranged to remove at least a portion of said airborne materials.

26. The exhaust fan of claim 21, wherein said exhaust fan is adapted to be installed manually in an aperture.

27. The exhaust fan of claim 26, wherein said aperture is a window.

28. The exhaust fan of claim 21, wherein electrical components of the exhaust fan are shielded to prevent exposure to the airborne materials suspended in the air.

29. The exhaust fan of claim 28, wherein the exhaust fan further comprises:
at least one enclosure for enclosing said electrical components of the exhaust fan, wherein said at least one enclosure is constructed and arranged to be substantially impenetrable by the airborne materials.

30. The exhaust fan of claim 5, wherein said at least one enclosure is mounted on surfaces of said housing.

31. The exhaust fan of claim 29, wherein one or more of the at least one enclosure is an explosion proof electrical box.

32. The exhaust fan of claim 24, further comprising:
electrical wiring to carry to the blower unit power made available by an external source; and
a sealed conduit through which said electrical wiring travels within said air passageway, wherein said sealed conduit is substantially impermeable to the airborne materials.

33. The exhaust fan of claim 21, wherein said airborne materials comprise paint overspray.

34. The exhaust fan of claim 24, wherein said electrical components are further prevented from exposure to air in the localized environment.

35. The exhaust fan of claim 24, further comprising:
an exhaust filter located adjacent to a discharge opening such that a substantial portion of the air expelled from the exhaust fan travels through the exhaust filter, wherein the exhaust filter is constructed and arranged to capture airborne materials.

36. The exhaust fan of claim 35, wherein the portion of the airborne materials removed from the air by the exhaust filter are materials that may damage the environment.

37. The exhaust fan of claim 21, further comprising:

an flexible exhaust tube having a first end adapted to be operationally coupled to one of either said inlet and send outlet opening of said exhaust fan.

38. The exhaust fan of claim 21, wherein the exhaust fan is portable.

* * * * *